(12) United States Patent
Rose

(10) Patent No.: US 7,421,840 B2
(45) Date of Patent: Sep. 9, 2008

(54) ENERGY CONVERSION AND DISSIPATION SYSTEM

(75) Inventor: Kenric B. Rose, Howell, MI (US)

(73) Assignee: Bosch Rexroth Corporation, Hoffman Estates, IL (US)

( * ) Notice: Subject to any disclaimer, the term of this patent is extended or adjusted under 35 U.S.C. 154(b) by 887 days.

(21) Appl. No.: 10/793,728

(22) Filed: Mar. 8, 2004

(65) Prior Publication Data

US 2005/0196292 A1    Sep. 8, 2005

(51) Int. Cl.
B60T 10/04    (2006.01)
B60T 1/093    (2006.01)

(52) U.S. Cl. .......................................... 60/329; 60/456

(58) Field of Classification Search .................... 60/329, 60/456, 912; 180/165
See application file for complete search history.

(56) References Cited

U.S. PATENT DOCUMENTS

| | | | | |
|---|---|---|---|---|
| 3,401,605 | A * | 9/1968 | Born ........................... | 60/329 |
| 3,664,129 | A * | 5/1972 | Schwab ....................... | 60/912 |
| 4,022,021 | A | 5/1977 | Russell, Jr. | |
| 4,179,888 | A | 12/1979 | Goscenski, Jr. | |
| 4,503,928 | A | 3/1985 | Mallen-Herrero et al. | |
| 4,738,330 | A * | 4/1988 | Suzuki et al. ............... | 180/421 |
| 4,941,437 | A * | 7/1990 | Suzuki et al. ................ | 60/456 |
| 5,072,584 | A | 12/1991 | Mauch et al. | |
| 5,178,238 | A | 1/1993 | Schaeff | |
| 5,946,911 | A | 9/1999 | Buschur et al. | |
| 6,021,641 | A | 2/2000 | Buschur et al. | |
| 6,158,216 | A | 12/2000 | Buschur et al. | |
| 6,681,568 | B2 * | 1/2004 | Smith ......................... | 60/456 |

FOREIGN PATENT DOCUMENTS

GB    1 436 809    5/1976

* cited by examiner

Primary Examiner—Thomas E Lazo
(74) Attorney, Agent, or Firm—Berenato, White & Stavish

(57) ABSTRACT

A hydraulic energy conversion and dissipation system comprises a hydraulic retarder pump driven by a source of a mechanical energy needed to be dissipated for converting the mechanical energy into a waste hydraulic energy, a hydraulic flow retarder provided for converting the waste hydraulic energy into a thermal energy, at least one heat exchanger for dissipating the thermal energy generated by the hydraulic flow retarder and at least one cooling fan provided for producing a forced air flow through the heat exchanger. The cooling fan is driven by a corresponding hydraulic motor powered by the waste hydraulic energy of the pressurized hydraulic fluid flow generated by the hydraulic retarder pump for further dissipating the waste hydraulic energy. The system further includes a hydraulic fluid reservoir in fluid communication with an inlet of the hydraulic retarder pump.

17 Claims, 3 Drawing Sheets

ENERGY CONVERSION AND DISSIPATION SYSTEM

BACKGROUND OF THE INVENTION

1. Field of the Invention

The present invention relates to hydraulic retarding apparatuses in general and, more particularly, to a hydraulic energy dissipation system for a hydraulic, mechanical energy retarding apparatus.

2. Description of the Prior Art

In a typical hydraulic energy dissipation system of a hydraulic retarding apparatus, pressurized hydraulic fluid generated by a mechanical energy needed to be dissipated flows across a certain restriction. As the fluid flows across this restriction, there is a pressure drop while the flow remains constant. This drop in pressure represents a decrease in the hydraulic potential energy. In the absence of any mechanical work being done, the change in hydraulic potential energy results in an increase in a thermal (or heat) energy of the hydraulic fluid as it passes through the restriction.

Typically, this heat energy is dissipated into the environment through the use of an air/fluid heat exchanger (radiator). To increase the amount of heat energy dissipated in the heat exchanger, a device such as a cooling fan may be used to force air movement through the heat exchanger. The energy to drive the cooling fan may come from a variety of sources, including an electrical system, an engine, a vehicle motion, or some combination thereof. Also, in many cases the energy used to drive the cooling fan is a parasitic load on the vehicle system to which it is coupled. This parasitic load may have an undesirable effect of causing an overall efficiency loss.

Accordingly, it is the intent of this invention to overcome these shortcomings of the prior art by allowing for a portion of the hydraulic energy converted from the mechanical energy to be used to drive a hydraulic fan motor coupled to the cooling fan.

SUMMARY OF THE INVENTION

An energy conversion and dissipation system in accordance with the preferred embodiments of the present invention includes a hydraulic retarder pump driven by a source of a mechanical energy needed to be dissipated, a hydraulic thermal loading valve and a heat dissipating system. The hydraulic retarder pump is provided for converting the mechanical energy into a waste hydraulic energy of a pressurized hydraulic fluid. The hydraulic thermal loading valve is provided for converting a portion of the waste hydraulic energy into a thermal energy. The heat dissipating system further comprises at least one heat exchanger for dissipating the thermal energy generated by the hydraulic thermal loading valve, and at least one cooling fan provided for producing a forced air flow through the at least one heat exchanger. Furthermore, the at least one cooling fan is driven by a corresponding hydraulic motor powered by the waste hydraulic energy of the pressurized hydraulic fluid generated by the hydraulic retarder pump for further dissipating the waste hydraulic energy.

Preferably, the energy conversion and dissipation system of the present invention further includes a hydraulic fluid reservoir provided for storing an appropriate amount of a hydraulic fluid. The hydraulic fluid reservoir is in fluid communication with an inlet of the hydraulic retarder pump.

Therefore, the present invention embodies a novel arrangement of the energy conversion and dissipation system comprising a primary retarder hydraulic pump provided for converting the mechanical energy into a waste hydraulic energy of a pressurized hydraulic fluid flow, a hydraulic thermal loading valve provided for converting the waste hydraulic energy into a thermal energy, and a heat dissipation system including a heat exchanger and a cooling fan selectively driven by a hydraulic fan motor driven by a portion of the hydraulic waste energy, which would normally be dissipated as heat.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred exemplary embodiments of the present invention will now be described with the reference to accompanying drawings.

Figure 1:
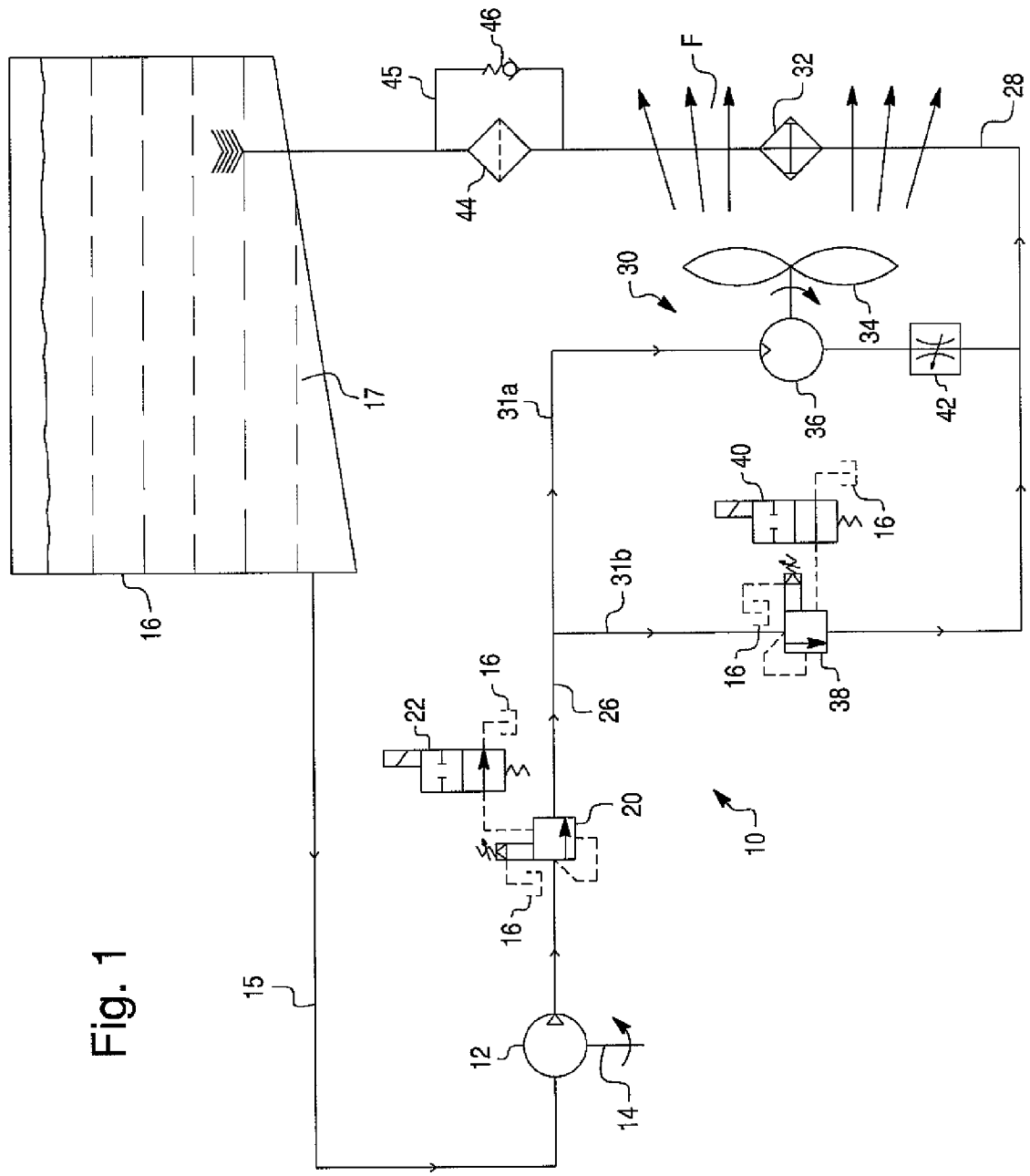
FIG. 1 is a schematic view of an energy conversion and dissipation system in accordance with a first exemplary embodiment of the present invention.

FIG. 1 schematically depicts an energy conversion and dissipation system, generally designated by the reference numeral 10, for a hydraulic retarding apparatus in accordance with a first exemplary embodiment of the present invention. The conversion and dissipation system 10 comprises a primary retarder hydraulic pump 12 and a heat dissipation system 30. The mechanical energy retarding apparatus of the present invention may be employed in various applications including but not limited to hydraulic retarding or hydraulic regenerating braking systems of motor vehicles. In such an application, the primary retarder hydraulic pump 12 is connected to a driveline of a motor vehicle through a shaft 14. Moreover, if the conversion and dissipation system 10 is used in the hydraulic regenerating braking system, the primary retarder hydraulic pump 12 may be in the form of a pump/motor.

The primary retarder hydraulic pump 12 is driven by a source of a mechanical energy needed to be dissipated and is provided for converting the mechanical energy into a waste hydraulic energy of a pressurized hydraulic fluid, such as during the deceleration of the motor vehicle. Preferably, the primary retarder hydraulic pump 12 is a fixed displacement pump, such as a positive displacement pump, e.g. a high pressure piston pump. Alternatively, the primary retarder hydraulic pump 12 may be a variable, positive displacement pump. It will be appreciated that any appropriate hydraulic pump is within the scope of the present invention.

The conversion and dissipation system 10 further comprises a remote hydraulic fluid reservoir 16 hydraulically connected to the primary retarder hydraulic pump 12. The hydraulic fluid reservoir 16 is provided for storing an appropriate amount of a hydraulic fluid 17 and supplying the hydraulic fluid 17 to the primary retarder pump 12. In the vehicle retarding operation, the mechanical energy of the motor vehicle is used to rotate the primary retarder hydraulic pump 12 which coupled to the vehicle driveline.

Subsequently, as the primary retarder pump 12 is rotated by the vehicle driveline, it draws the hydraulic fluid 17 from the hydraulic fluid reservoir 16 via an inlet hydraulic passage 15 and generates a hydraulic pressure, thus transforming the mechanical energy of the decelerating motor vehicle into the hydraulic waste energy of the pressurized hydraulic fluid.

The flow of the hydraulic fluid 17 from the primary retarder pump 12 is supplied under pressure to an inlet port of a hydraulic thermal loading valve 20, which is preferably in the form of a variable, pilot operated relief valve with external vent and drain ports. The external drain port of the hydraulic thermal loading valve 20 is vented back to the hydraulic fluid reservoir 16. This configuration allows the hydraulic pressure maintained at an inlet of the hydraulic thermal loading valve 20 to be insensitive to backpressure at an outlet thereof. The drain port of the hydraulic thermal loading valve 20 is connected to a main pilot valve 22, which is a spring biased, solenoid operated, 2-way directional valve.

In the de-energized state, the bias spring in the main pilot valve 22 forces the valve mechanism to allow a free flow path from the vent port of the hydraulic thermal loading valve 20 to the hydraulic fluid reservoir 16. In this state, the hydraulic thermal loading valve 20 cannot throttle the flow from the primary retarder pump 12 and therefore the conversion and dissipation system 10 is "unloaded". When the conversion and dissipation system 10 is "unloaded", very little power can be absorbed from the driveline of the motor vehicle.

In the energized state, when the solenoid of the main pilot valve 22 is energized, the hydraulic flow from the vent port of the hydraulic thermal loading valve 20 is prevented and therefore the conversion and dissipation system 10 is "loaded". In this case, the hydraulic thermal loading valve 20 will throttle the flow of hydraulic fluid from the primary retarder pump 12 in order to build hydraulic pressure at the inlet of the hydraulic thermal loading valve 20 to the relief setting of the valve. In this state, energy is absorbed from the vehicle driveline proportional to the hydraulic fluid flow from the primary retarder pump 12 and the hydraulic pressure created by the hydraulic thermal loading valve 20. Therefore, the hydraulic thermal loading valve 20 is provided to transform the hydraulic waste energy converted from the mechanical energy of the decelerating motor vehicle, into a thermal energy of the hydraulic fluid.

Consequently, as the hydraulic fluid exits the hydraulic thermal loading valve 20 through an exit passageway 26, the temperature of the hydraulic fluid significantly increases proportional to the pressure drop across the hydraulic thermal loading valve 20 and the specific thermodynamic characteristics of the hydraulic fluid. The thermal energy of the hydraulic fluid is substantially equal to the energy absorbed from the driveline of the vehicle. This thermal energy either must be rejected from the hydraulic fluid, or the operation of the conversion and dissipation system 10 must be limited. The practical limit of the conversion and dissipation system 10 is a function of a thermal mass of the hydraulic fluid, the rate of thermal energy absorption, and the rate of thermal energy rejection.

The hydraulic fluid 17 exiting the hydraulic thermal loading valve 20 through the exit passageway 26, is returned to the fluid reservoir 16 by way of a return flow passageway 28 through the heat dissipation system 30. As illustrated in FIG. 1, the heat dissipation system 30 comprises a heat exchanger 32 provided in the return flow passageway 28, a cooling fan 34 associated with the heat exchanger 32 for forced cooling of the hydraulic fluid 17 flowing through the heat exchanger 32. The cooling fan 34 is selectively driven by a hydraulic motor 36 which, in turn, is selectively operated by a fan motor hydraulic pressure control valve 38, which effectively controls a bypass hydraulic line of the hydraulic fan motor 36. Preferably, the fan motor pressure control valve 38 is in the form of a variable, pilot operated relief valve with external vent and drain ports. The fan motor pressure control valve 38 arranged in parallel with the cooling fan hydraulic motor 36 for selectively regulating the pressure of the hydraulic fluid supplied to the hydraulic motor 36.

As the hydraulic fluid 17 exits the hydraulic thermal loading valve 20, the exit passageway 26 is split into two parallel flow paths. One flow path is a first hydraulic line 31a that includes the hydraulic fan motor 36, while another path is a second hydraulic line 31b that includes the fan motor pressure control valve 38. The hydraulic fluid flowing though the first hydraulic line 31a causes the hydraulic fan motor 36 and the attached cooling fan 34 to spin. The amount of the hydraulic fluid allowed to flow through the hydraulic fan motor 36 is limited by a hydraulic flow rate control valve 42. The flow rate control valve 42 is disposed in the first hydraulic line 31a to control the rate of hydraulic fluid supply from the hydraulic fan motor 36 through the first hydraulic line 31a in order to prevent over-speeding of the hydraulic fan motor 36. Preferably, the flow rate control valve 42 is a variable flow rate control valve of the type that is operative to vary the fluid-passage cross-sectional area of the first hydraulic line 31a. One of ordinary skill in the art would appreciate that any other appropriate type of the flow rate control valve may be employed without departing from the scope of the present invention.

The action of the cooling fan 34 on the surrounding air mass causes a flow F of air across the heat exchanger 32 and a reverse torque applied to a shaft of the hydraulic fan motor 36. The reverse torque on the hydraulic fan motor 36 causes a restriction to the free flow of the hydraulic fluid through the motor 36. This restriction of flow causes a pressure drop across the hydraulic fan motor 36. The pressure drop and flow across the hydraulic fan motor 36 results in a conversion of hydraulic waste energy to kinetic energy, thus a portion of the hydraulic waste energy, which would normally be dissipated as heat, is used to drive the hydraulic fan motor 36 to force air through the heat exchanger 32. As a result, the parasitic loads previously mentioned as needed to drive the cooling fan would be eliminated. Also, since some of the hydraulic waste energy is being converted into mechanical energy, less hydraulic waste energy needs to be converted into the thermal energy, which reduces the overall heat load in the heat exchanger.

The pressure built up at the inlet of the hydraulic thermal loading valve 20 is also present at the outlet of the hydraulic thermal loading valve 20. Since the hydraulic thermal loading valve 20 is externally drained, the presence of this pressure does not result in a corresponding increase in pressure at the inlet thereof. The result is that the pressure differential across the hydraulic thermal loading valve 20 is reduced proportional to the pressure built up due to the operation of the hydraulic fan motor 36. This reduction in pressure differential results in a proportional reduction of the amount of hydraulic waste energy converted to the thermal energy. The result of the operation of the heat dissipation system 30 is not only that the hydraulic fan motor 36 runs essentially from "free" energy, which would have been converted to low-grade thermal waste energy, but that the amount of thermal energy required to be rejected is also reduced.

The hydraulic fluid flowing though the second hydraulic line 31b passes through the fan motor pressure control valve 38 provided to selectively control the hydraulic fan motor 36 by limiting the maximum pressure across the hydraulic fan motor 36 and the flow rate control valve 42 thereof. Any flow in excess of the setting of the flow rate control valve 42 is exhausted across this valve. The fan motor pressure control valve 38 in accordance with the first exemplary embodiment of the present invention is pilot operated by a directional control valve 40. Preferably, the directional control valve 40 is a spring biased, solenoid operated, 2-way directional valve. The directional control valve 40 is connected to the vent port of the fan motor pressure control valve 38.

In the normal de-energized state of the directional control valve 40, when its solenoid is de-energized, free flow of the hydraulic fluid is allowed from the vent port of the fan motor pressure control valve 38. In this state, the fan motor pressure control valve 38 is "unloaded" so that it cannot throttle the hydraulic fluid flow and therefore cannot have a pressure differential across its ports. The result is that the hydraulic fluid will follow the path of least resistance and therefore bypass the hydraulic fan motor 36. When the solenoid of the directional control valve 40 is energized, the hydraulic fluid flow from the vent port of the fan motor pressure control valve 38 is prevented and the pressure differential is controlled by the internal spring bias set point of the valve 38. Therefore, electrical control of the solenoid on the directional control valve 40 results in control of the hydraulic fan motor 36 by the fan motor pressure control valve 38.

The respective hydraulic fluid flows across the hydraulic fan motor 36 and the fan motor pressure control valve 38 are combined to flow across the heat exchanger 32, where the thermal energy is rejected to the environment with the aid of the cooling fan 34.

The hydraulic fluid exiting the heat exchanger 32 is returned to the fluid reservoir 16 through a particulate filter 44 provided in the return flow passageway 28. Furthermore, the return flow passageway 28 includes a filter bypass line 45 for bypassing the particulate filter 44 in case of clogging thereof. In turn, the filter bypass line 45 is provided with a check valve 46.

Figure 2:
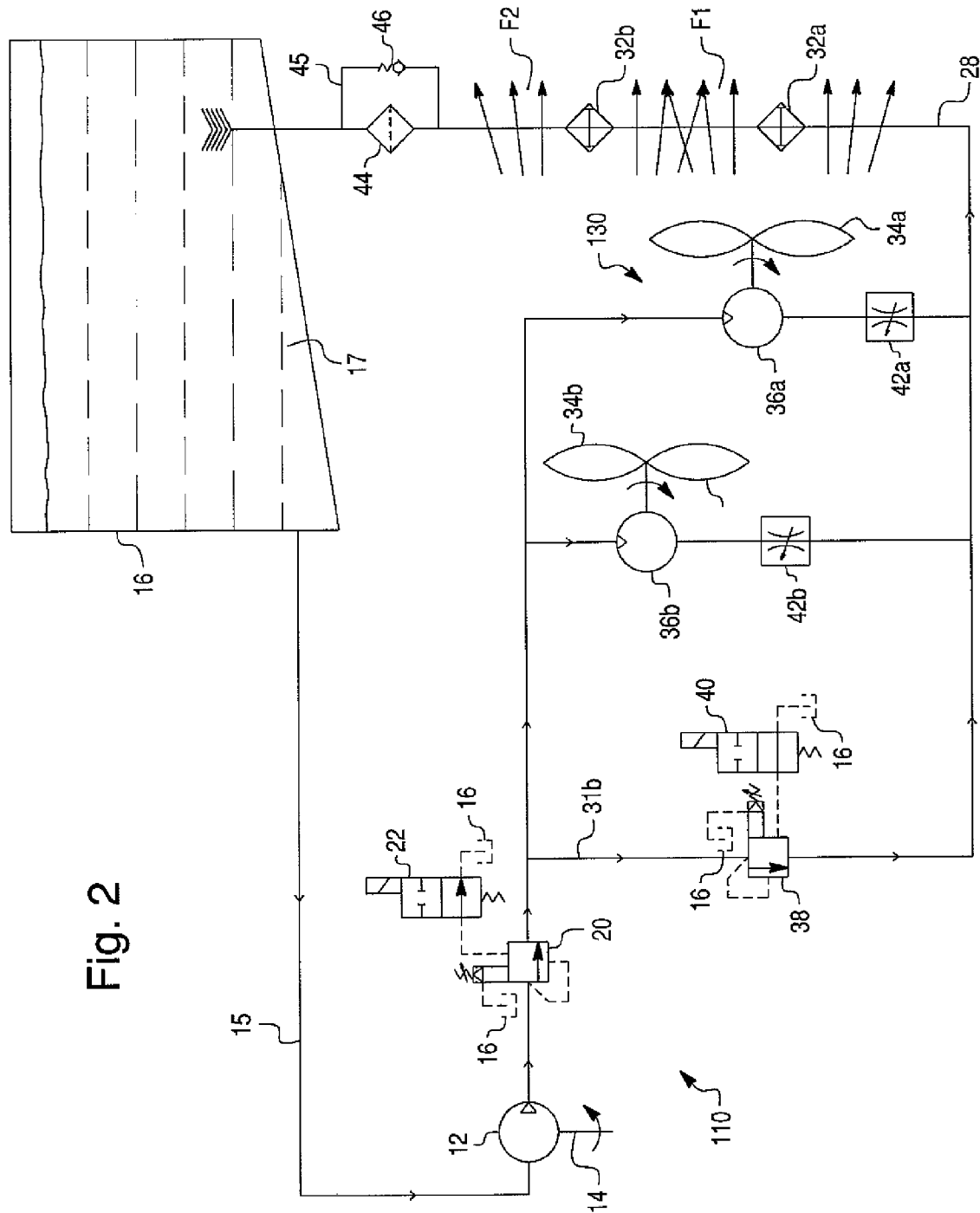
FIG. 2 is a schematic view of an energy conversion and dissipation system in accordance with a second exemplary embodiment of the present invention.

FIG. 2 illustrates a second exemplary embodiment of the energy conversion and dissipation system in accordance with the present invention generally depicted by the reference numeral 110. Components that are unchanged from, or function in the same way as in the first exemplary embodiment depicted in FIG. 1 are labeled with the same reference numerals and sometimes without describing details since similarities between the corresponding parts in the two embodiments will be readily perceived by the reader. The conversion and dissipation system 110 of FIG. 2 corresponds substantially to the conversion and dissipation system 10 of FIG. 1, and only the energy conversion and dissipation system, which differ, will therefore be explained in detail below. The heat dissipation system in accordance with the second exemplary embodiment of the present invention, generally designated by the reference numeral 130 is substantially identical to the heat dissipation system 30 in accordance with the first exemplary embodiment of the present invention, however this embodiment includes multiple parallel hydraulically driven cooling fans.

Preferably, as illustrated in FIG. 2, the heat dissipation system 130 comprises two heat exchangers 32a and 32b and two cooling fans 34a and 34b associated with the heat exchangers 32a and 32b, respectively, for forced cooling of the hydraulic fluid 17 flowing through the heat exchangers 32a and 32b. The cooling fans 34a and 34b are selectively driven by corresponding parallel hydraulic fan motors 36a and 36b which, in turn, are selectively operated by the fan motor hydraulic pressure control valve 38. It will be appreciated that the action of the cooling fan 34a on the surrounding air mass causes a flow $F_1$ of air across the heat exchanger 32a, while the action of the cooling fan 34b on the surrounding air mass causes a flow $F_2$ of air across the heat exchanger 32b. Synchronization of the hydraulic motor/fan speeds may be accomplished through of individual flow rate control valves 42a and 42b for each of the hydraulic fan motors 36a and 36b.

One of ordinary skill in the art would appreciate that virtually any number of the heat exchangers and associated cooling fans and corresponding hydraulic motors driving these fans may be employed without departing from the scope of the present invention.

Figure 3:
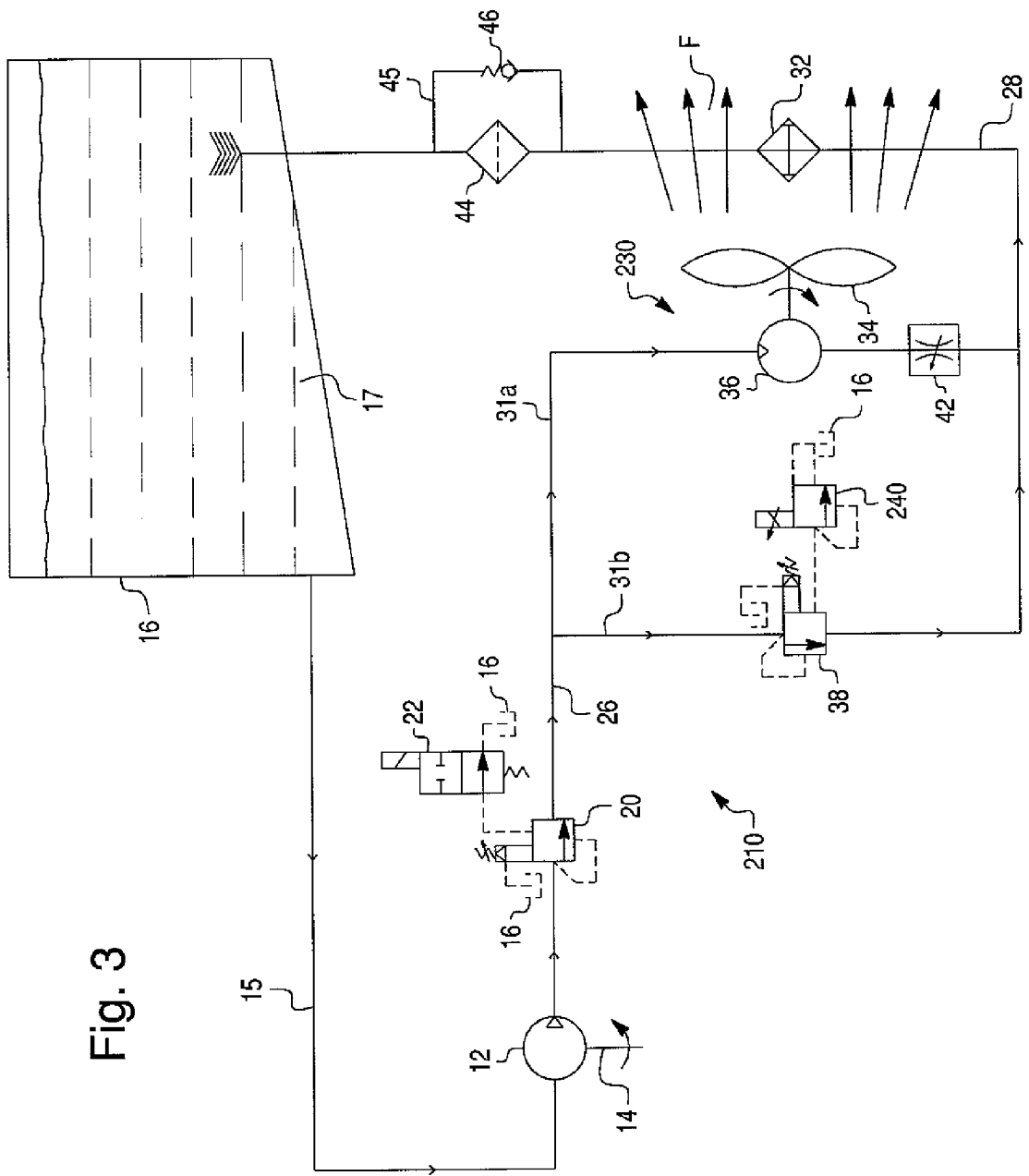
FIG. 3 is a schematic view of an energy conversion and dissipation system in accordance with a third exemplary embodiment of the present invention.

FIG. 3 shows a third exemplary embodiment of the energy conversion and dissipation system in accordance with the present invention generally depicted by the reference numeral 210. Components that are unchanged from, or function in the same way as in the first exemplary embodiment depicted in FIG. 1 are labeled with the same reference numerals and sometimes without describing details since similarities between the corresponding parts in the two embodiments will be readily perceived by the reader. The conversion and dissipation system 210 of FIG. 3 corresponds substantially to the conversion and dissipation system 10 of FIG. 1, and only the heat dissipation system, which differ, will therefore be explained in detail below. The heat dissipation system in accordance with the third exemplary embodiment of the present invention, generally designated by the reference numeral 230 is substantially identical to the heat dissipation system 30 in accordance with the first exemplary embodiment of the present invention, however in this embodiment the fan motor hydraulic pressure control valve 38 is pilot operated by a proportional pilot relief valve 240 instead of the directional control valve 40 of the first exemplary embodiment of the present invention.

Through proportional control of the fan motor hydraulic pressure control valve 38 pressure drop, a variable differential pressure across the hydraulic fan motor 36 may be achieved. The variable differential pressure across the hydraulic fan motor 36 results in a variable fan speed, thus variable force applied to the ambient air propelled by fan blades. This variable fan force results in a variable speed and volume of the air flow F forced across the heat exchanger 32.

In this embodiment, the hydraulic flow rate control valve 42 associated with the hydraulic fan motor 36 is used to prevent over-speeding of the hydraulic fan motor 36. Below a flow limiting setting of the flow rate control valve 42, it has little effect on controlling the speed of the hydraulic fan motor 36. However, in the circumstances where the pressure differential across the hydraulic fan motor 36 causes the fan blades to spin fast enough that the hydraulic fluid flow across the hydraulic fan motor 36 reaches the flow limiting setting of the flow rate control valve 42, further increases in the fan motor speed are limited by the flow rate control valve 42.

It will be appreciated that the system in accordance with the third exemplary embodiment of the present invention is scalable for multiple heat exchangers, parallel hydraulic fan motors and associated cooling fans and hydraulic flow rate control valves as in the second exemplary embodiment of the present invention.

Therefore, the present invention embodies a novel arrangement of the energy conversion and dissipation system comprising a primary retarder hydraulic pump provided for converting the mechanical energy into a waste hydraulic energy of a pressurized hydraulic fluid flow, a hydraulic thermal loading valve provided for converting the waste hydraulic energy into a thermal energy, and a heat dissipation system including a heat exchanger and a cooling fan selectively driven by a hydraulic fan motor driven by a portion of the hydraulic waste energy, which would normally be dissipated as heat.

The foregoing description of the preferred exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An energy conversion and dissipation system comprising:
   a hydraulic retarder pump driven by a source of a mechanical energy needed to be dissipated, said hydraulic retarder pump provided for converting the mechanical energy into a waste hydraulic energy of a pressurized hydraulic;
   a hydraulic fluid reservoir provided for storing an appropriate amount of a hydraulic fluid, said hydraulic fluid reservoir is in fluid communication with an inlet of said hydraulic retarder pump;
   a hydraulic thermal loading valve provided for converting a portion of the waste hydraulic energy into a thermal energy, said hydraulic thermal loading valve being a variable relief valve with external vent and drain ports selectively fluidly connected to said hydraulic fluid reservoir;
   at least one heat exchanger for dissipating the thermal energy generated by said hydraulic thermal loading valve; and
   at least one cooling fan provided for producing a forced air flow through said at least one heat exchanger, said at least one cooling fan is driven by an associated hydraulic motor powered by the waste hydraulic energy of said pressurized hydraulic fluid generated by said hydraulic retarder pump for further dissipating the waste hydraulic energy, said hydraulic retarder pump being fluidly connected to said associated hydraulic motor driving said at least one cooling fan through said hydraulic thermal loading valve.

2. The energy conversion and dissipation system as defined in claim 1, wherein said external vent and drain ports operated by a main pilot valve.

3. The energy conversion and dissipation system as defined in claim 2, wherein said main pilot valve is a spring biased, solenoid operated, 2-way directional valve.

4. The energy conversion and dissipation system as defined in claim 1, further including a fan motor hydraulic pressure control valve provided for selectively regulating a rotational speed of said hydraulic motor associated with said at least one cooling fan.

5. The energy conversion and dissipation system as defined in claim 4, wherein said fan motor hydraulic pressure control valve is a variable relief valve with external vent and drain ports operated by a pilot valve.

6. The energy conversion and dissipation system as defined in claim 5, wherein said pilot valve is a spring biased, solenoid operated, 2-way directional valve.

7. The energy conversion and dissipation system as defined in claim 5, wherein said pilot valve is a proportional pilot relief valve.

8. The energy conversion and dissipation system as defined in claim 4, wherein said fan motor hydraulic pressure control valve is disposed in parallel with said hydraulic motor associated with said at least one cooling fan.

9. The energy conversion and dissipation system as defined in claim 1, further including a particulate filter.

10. The energy conversion and dissipation system as defined in claim 9, further including a filter bypass line for bypassing said particulate filter in case of clogging thereof.

11. An energy conversion and dissipation system comprising:
    a hydraulic retarder pump driven by a source of a mechanical energy needed to be dissipated, said hydraulic retarder pump provided for converting the mechanical energy into a waste hydraulic energy of a pressurized hydraulic;
    a hydraulic thermal loading valve provided for converting a portion of the waste hydraulic energy into a thermal energy;
    at least one heat exchanger for dissipating the thermal energy generated by said hydraulic thermal loading valve;
    at least one cooling fan provided for producing a forced air flow through said at least one heat exchanger, said at least one cooling fan is driven by an associated hydraulic motor powered by the waste hydraulic energy of said pressurized hydraulic fluid generated by said hydraulic retarder pump for further dissipating the waste hydraulic energy; and
    at least one hydraulic flow rate control valve provided in series with said hydraulic motor associated with said at least one cooling fan.

12. The energy conversion and dissipation system as defined in claim 11, wherein said at least one hydraulic flow rate control valve is a variable flow rate control valve provided to vary a cross-sectional area thereof.

13. The energy conversion and dissipation system as defined in claim 11, wherein said hydraulic thermal loading valve is a variable relief valve operated by a main pilot valve.

14. The energy conversion and dissipation system as defined in claim 13, wherein said main pilot valve is a spring biased, solenoid operated, 2-way directional valve.

15. An energy conversion and dissipation system comprising:
    a hydraulic retarder pump driven by a source of a mechanical energy needed to be dissipated, said hydraulic retarder pump provided for converting the mechanical energy into a waste hydraulic energy of a pressurized hydraulic;
    a hydraulic thermal loading valve provided for converting a portion of the waste hydraulic energy into a thermal energy;
    at least two heat exchangers for dissipating the thermal energy generated by said hydraulic thermal loading valve;
    at least two cooling fans provided for producing a forced air flow through each of said at least two heat exchanger; and
    at least two hydraulic motors powered by the waste hydraulic energy of said pressurized hydraulic fluid generated by said hydraulic retarder pump for further dissipating the waste hydraulic energy;

each of said at least two hydraulic motors is provided to drive an associated one of said at least two cooling fans.

16. The energy conversion and dissipation system as defined in claim 15, further including a fan motor hydraulic pressure control valve provided for selectively regulating a rotational speed of each of said at least two hydraulic motors associated with said at least two cooling fans.

17. The energy conversion and dissipation system as defined in claim 16, wherein said fan motor hydraulic pressure control valve is disposed in parallel with each of said at least two hydraulic motors.

* * * * *